(12) United States Patent
Shiga et al.

(10) Patent No.: US 9,174,089 B2
(45) Date of Patent: Nov. 3, 2015

(54) GOLF BALL AND METHOD FOR PRODUCING THE SAME

(75) Inventors: Kazuyoshi Shiga, Kobe (JP); Takashi Sasaki, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 523 days.

(21) Appl. No.: 12/821,633

(22) Filed: Jun. 23, 2010

(65) Prior Publication Data

US 2010/0331115 A1    Dec. 30, 2010

(30) Foreign Application Priority Data

Jun. 29, 2009  (JP) .................... 2009-154269

(51) Int. Cl.
| | | |
|---|---|---|
| *A63B 37/06* | (2006.01) | |
| *A63B 37/00* | (2006.01) | |
| *C08G 18/08* | (2006.01) | |
| *C08G 18/48* | (2006.01) | |
| *C08G 18/75* | (2006.01) | |
| *C08G 18/76* | (2006.01) | |
| *C08G 18/80* | (2006.01) | |
| *B29C 45/00* | (2006.01) | |

(Continued)

(52) U.S. Cl.
CPC ........ *A63B 37/0023* (2013.01); *C08G 18/0814* (2013.01); *C08G 18/482* (2013.01); *C08G 18/4854* (2013.01); *C08G 18/758* (2013.01); *C08G 18/7664* (2013.01); *C08G 18/8041* (2013.01); *B29C 45/0013* (2013.01); *B29K 2709/00* (2013.01); *C08K 3/346* (2013.01); *C08K 9/04* (2013.01)

(58) Field of Classification Search
CPC .................... A63B 37/0023; A63B 37/0024
USPC ................................... 473/351, 378
See application file for complete search history.

(56) References Cited

U.S. PATENT DOCUMENTS 5,306,760 A    4/1994  Sullivan
5,692,974 A    12/1997 Wu et al.
(Continued)

FOREIGN PATENT DOCUMENTS

JP    8-302068 A   11/1996
JP    9-124836 A    5/1997
(Continued)

OTHER PUBLICATIONS

Choi et al., "Synthesis of chain-extended organifier and properties of polyurethane/clay nanocomposites", Polymer, vol. 45, 2004, pp. 6045-6057.

(Continued)

*Primary Examiner* — Raeann Gorden
(74) *Attorney, Agent, or Firm* — Birch Stewart Kolasch & Birch, LLP (57) ABSTRACT

An object of the present invention is to improve the abrasion resistance and controllability in a golf ball having a polyurethane cover containing a layered silicate or the exfoliated layer thereof. The present invention provides a golf ball comprising a core and a cover covering the core, wherein the cover comprises a polyurethane resin having a secondary or tertiary amine structure in a molecular chain thereof, the secondary or tertiary amine structure being cationized, and a layered silicate and/or an exfoliated product thereof, having an average aspect ratio of unit layers thereof ranging from 10 to 50.

17 Claims, 2 Drawing Sheets

(51) Int. Cl.
*B29K 709/00* (2006.01)
*C08K 3/34* (2006.01)
*C08K 9/04* (2006.01)

(56) References Cited

U.S. PATENT DOCUMENTS

| | | | |
|---|---|---|---|
| 5,851,245 | A | 12/1998 | Moriyama et al. |
| 6,051,643 | A | 4/2000 | Hasegawa et al. |
| 6,688,992 | B2 | 2/2004 | Takemura et al. |
| 6,793,592 | B2 | 9/2004 | Sullivan et al. |
| 6,794,447 | B1 | 9/2004 | Kim et al. |
| 7,066,836 | B2 | 6/2006 | Hayashi |
| 7,332,533 | B2 | 2/2008 | Kim et al. |
| 7,943,689 | B2 | 5/2011 | Shiga et al. |
| 2002/0045501 | A1 | 4/2002 | Takemura et al. |
| 2004/0048129 | A1 | 3/2004 | Taft, III et al. |
| 2004/0092336 | A1 | 5/2004 | Kim et al. |
| 2005/0059756 | A1 | 3/2005 | Kim et al. |
| 2005/0228140 | A1 | 10/2005 | Rajagopalan et al. |
| 2006/0009308 | A1 | 1/2006 | Isogawa et al. |
| 2006/0009585 | A1 | 1/2006 | Fujisawa et al. |
| 2006/0046871 | A1 | 3/2006 | Ohama et al. |
| 2006/0128867 | A1 | 6/2006 | Marx et al. |
| 2006/0137797 | A1 | 6/2006 | Galimberti et al. |
| 2006/0235128 | A1 | 10/2006 | Wang et al. |
| 2007/0276109 | A1 | 11/2007 | Sawaguchi et al. |
| 2008/0214326 | A1 | 9/2008 | Kim et al. |
| 2008/0293518 | A1* | 11/2008 | Shiga et al. .............. 473/378 |
| 2009/0197706 | A1 | 8/2009 | Yamada et al. |
| 2010/0331115 | A1 | 12/2010 | Shiga et al. |

FOREIGN PATENT DOCUMENTS

| | | | |
|---|---|---|---|
| JP | 9-183910 | A | 7/1997 |
| JP | 10168305 | A | 6/1998 |
| JP | 2002-136618 | A | 5/2002 |
| JP | 2002-539905 | A | 11/2002 |
| JP | 2003-511116 | A | 3/2003 |
| JP | 2004-504900 | A | 2/2004 |
| JP | 2005-28153 | A | 2/2005 |
| JP | 2005-106859 | A | 4/2005 |
| JP | 2006-43447 | A | 2/2006 |
| JP | 2006-95286 | A | 4/2006 |
| JP | 2006-346014 | A | 12/2006 |
| JP | 2006-346015 | A | 12/2006 |
| JP | 2008-289674 | A | 12/2008 |
| KR | 2005-112693 | A | 12/2005 |
| WO | WO 00/57962 | A1 | 5/2000 |
| WO | WO 01/24888 | A1 | 4/2001 |

OTHER PUBLICATIONS

English language Japanese Office Action for Application No. 2009-154269 dated Jul. 26, 2011.
Inagaki et al., "Synthesis and characterization of highly ordered mesoporous material; FSM-16, from a layered polysilicate", Studies in Surface Science and Catalysis, vol. 84, 1994, pp. 125-132.
Inagaki et al., "Synthesis of New Mesoporous Material by Folding Silicate Sheets", Science and Technology in Catalysis, 1994, pp. 143-148.
Japanese Office Action for Application No. 2007-138441 dated Apr. 28, 2009, with English translation.
Laviosa Chimica Mineraria S.p.A., "Nanoclay for nanocomposites", DELLITE® 67G, 1 page.
Nanocor, "Nylon Nanocomposites Using Nanomer® I.24TL Nanoclay", Lit N-609 (Oct. 2004), 2 pages.
Shah et al., "Nanocomposites from poly(ethylene-co-methacrylic acid) ionomers: effect of surfactant structure on morphology and properties", Polymer, vol. 46, 2005, pp. 2646-2662.
U.S. Office Action for U.S. Appl. No. 12/153,682 dated Sep. 17, 2010.
U.S. Office Action for U.S. Appl. No. 12/363,368 dated Sep. 21, 2011.
U.S. Office Action for U.S. Appl. No. 12/422,392 dated Aug. 10, 2011.
U.S. Office Action for U.S. Appl. No. 12/422,505 dated Aug. 10, 2011.
Japanese Office Action for Japanese Application No. 2008-021852 dated Mar. 21, 2012 with English translation.
Japanese Office Action for Japanese Application No. 2008-110385 dated Mar. 21, 2012 with English translation.
US Office Action for U.S. Appl. No. 12/363,368 dated Feb. 24, 2012.
English translation of Japanese Office Action dated Jul. 3, 2012, for Application No. JP2009-090516.
English translation of Japanese Office Action dated Nov. 6, 2012, for Application No. JP2008-110385.
Kirk-Othmer, "Concise Encyclopedia of Chemical Technology", 1990, pp. 1053, 1058.
Mayer et al., "Characterizing Radiation-Aged Polysiloxane-Silica Composites: Identifying Changes in Network Topology via 1H NMR"; Chemical Engineering Science, Aug. 12, 2008, pp. 1-15.

* cited by examiner

GOLF BALL AND METHOD FOR PRODUCING THE SAME

BACKGROUND OF THE INVENTION

1. Field of the Invention

The present invention relates to a golf ball having a polyurethane cover and a method for producing the same, more specifically to technology for improving abrasion-resistance and controllability of the golf ball.

2. Description of the Related Art

As the base resin constituting the cover of the golf ball, an ionomer resin and a polyurethane resin are used. The cover using the ionomer resin is widely used because they are excellent in resilience, durability, processability or the like. There have been pointed out problems of poor shot feeling, insufficient spin performance, and inferior controllability since the ionomer resin cover has high rigidity and hardness. On the other hand, a polyurethane resin is used as a base resin constituting a cover because it provides improved shot feeling and spin performance compared with the ionomer resin. In recent years, however, accompanied with reduction of a thickness of a golf ball cover (thinner cover) and improvement of golf clubs (higher repulsion, lower spin, and change in groove configuration of face), there has been a demand for further improving cover performance of a golf ball, because abrasion-resistance and spin performance of a cover using a conventional polyurethane resin are no longer at a satisfactory level.

In view of such circumstances, for example, Japanese patent publication Nos. 2002-136618A, 2002-539905T, 2003-511116T, 2006-43447A and 2004-504900T propose improving cover properties by blending a filler such as an organic short fiber, a glass, a metal, and a clay mineral in a base resin constituting a cover. Additionally, technology for improving a mechanical property of polyurethane is disclosed in, for example, Japanese patent publication No. H10-168305A and Korean patent publication No. 2005-0112693. Further, Japanese patent publication No. 2008-289674A discloses a golf ball wherein the cover comprises a polyurethane resin having a secondary or tertiary amine structure in a molecular chain thereof and a layered silicate.

SUMMARY OF THE INVENTION

So far, it is known that the abrasion resistance and the controllability are improved by blending a layered silicate into the polyurethane cover. However, the layered silicate to be blended has not been studied, and there still remains room for further improvement.

The present invention has been made in view of the above circumstances, and an object of the present invention is to improve the abrasion resistance and controllability in a golf ball having a polyurethane cover containing a layered silicate and/or the exfoliated layer thereof.

The present invention that has solved the above problem provides a golf ball comprising a core and a cover covering the core, wherein the cover comprises a polyurethane resin having a secondary or tertiary amine structure in a molecular chain thereof, the secondary or tertiary amine structure being cationized, and a layered silicate and/or an exfoliated product thereof, having an average aspect ratio of unit layers thereof ranging from 10 to 50. The layered silicate having an aspect ratio of unit layers ranging from 10 to 50 is easily exfoliated into unit layers, since the area of the unit layer is small. As a result, it is considered that electrostatic interaction points increase and the abrasion resistance further improves.

The present invention also provides a method for producing a golf ball having a core and a cover covering the core, comprising the steps of: cationizing a polyol having a secondary or tertiary amine structure in a molecule thereof, dispersing a layered silicate having an average aspect ratio of unit layers thereof ranging from 10 to 50 into the cationized polyol to obtain a polyol-layered silicate composite, mixing the polyol-layered silicate composite, a polyol component, and a polyisocyanate component to prepare a cover composition, and molding a cover from the cover composition.

According to the present invention, it is possible to improve the abrasion resistance and controllability in a golf ball having a polyurethane cover containing a layered silicate and/or the exfoliated product thereof.

DESCRIPTION OF THE PREFERRED EMBODIMENT

The present invention is directed to a golf ball comprising a core and a cover covering the core, wherein the cover comprises a polyurethane resin having a secondary or tertiary amine structure in a molecular chain thereof, the secondary or tertiary amine structure being cationized, and a layered silicate and/or an exfoliated product thereof, having an average aspect ratio of unit layers thereof ranging from 10 to 50. Hereinafter, the polyurethane resin before the secondary or tertiary amine structure is cationized is referred to as "amine incorporated polyurethane resin" and the polyurethane resin after the secondary or tertiary amine structure is cationized is referred to as "cationized polyurethane resin," respectively.

Figure 1:
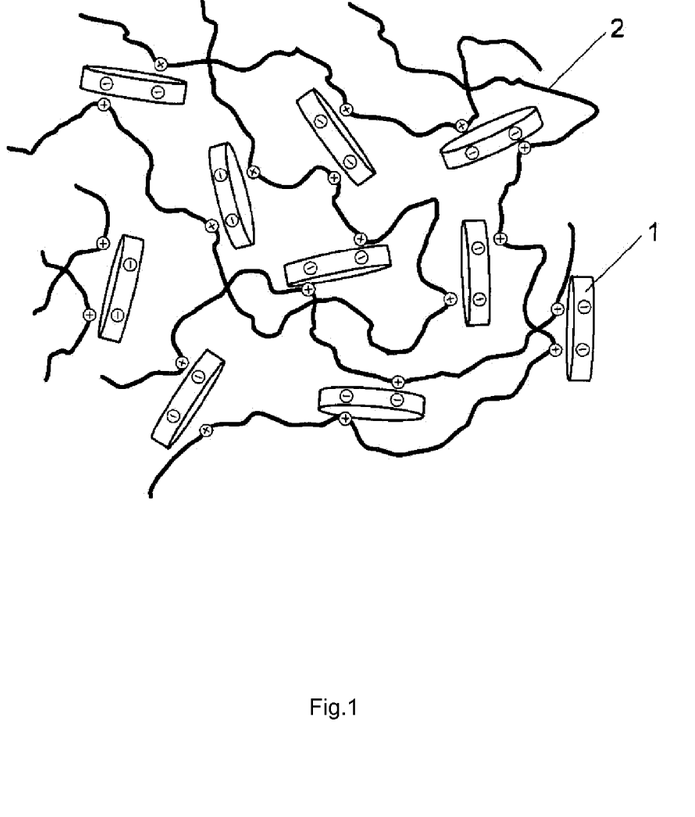
FIG. 1 is a view schematically showing a crosslinking action by the layered silicate having an average aspect ratio of unit layers thereof ranging from 10 to 50.

In a golf ball having a cover containing the layered silicate, the reason why the abrasion resistance and controllability of the golf ball are improved by use of the layered silicate having an average aspect ratio of unit layers thereof ranging from 10 to 50 is not necessarily clear but considered as follows. In the followings, the reason is explained referring to FIGS. 1 and 2. FIG. 1 is a view schematically showing a crosslinking action by the layered silicate having an average aspect ratio of unit layers thereof ranging from 10 to 50; and FIG. 2 is a view schematically showing a crosslinking action by the layered silicate having an average aspect ratio of unit layers thereof more than 50.

Figure 2:
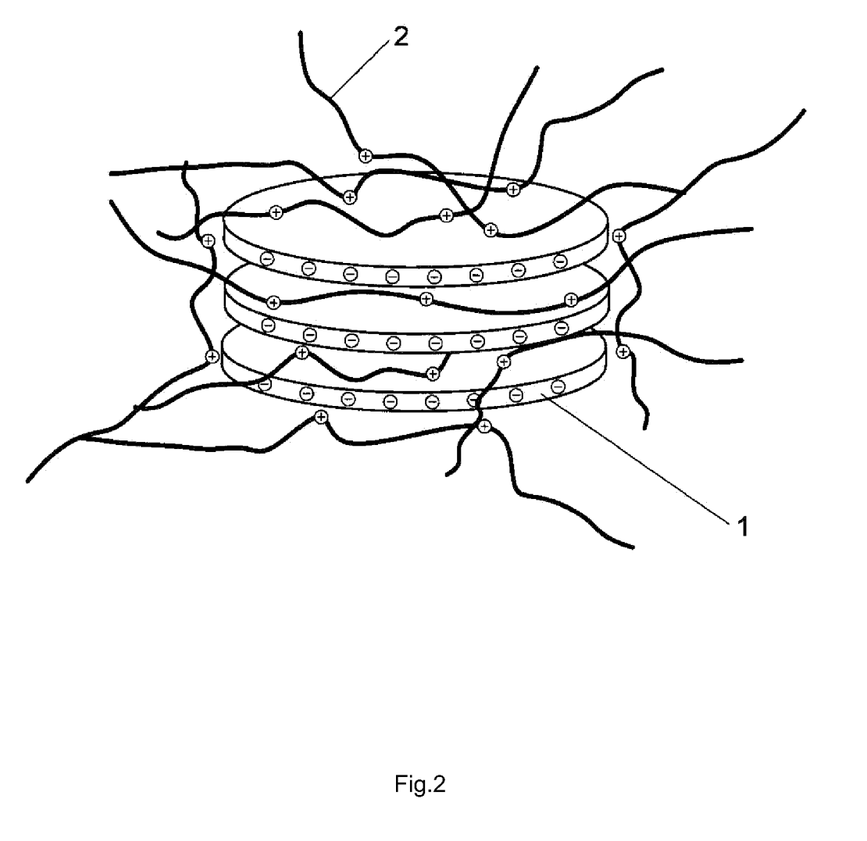
FIG. 2 is a view schematically showing a crosslinking action by the layered silicate having an average aspect ratio of unit layers thereof more than 50.

Namely, as shown in FIG. 2, in the layered silicate 1 having an average aspect ratio of unit layers more than 50, since the area of the unit layer is large, the interlayer electrostatic interaction becomes large. Accordingly, the layered silicate 2 maintains the layered structure even in the cationized polyurethane resin 2, and plurality of layers constitutes a large aggregate that functions as electrostatic interaction point to the cationized polyurethane resin 2. As a result, the number of the electrostatic interaction points of the cationized polyurethane resin 2 to the layered silicate 1 to be blended is relatively small.

On the contrary, in the case of the layered silicate 1 having an average aspect ratio of unit layers ranging from 10 to 50, the interlayer electrostatic interaction is small, because of the small area of the unit layer. Accordingly, the layered silicate 1 is easily exfoliated into unit layers, in the cationized polyurethane resin 2. Thus, as shown in FIG. 1, each unit layer functions as an electrostatic interaction point. Accordingly, the electrostatic interaction points of the cationized polyurethane resin 2 increase and the abrasion resistance further improves.

(1) Layered Silicate

The layered silicate and/or an exfoliated product thereof, having an average aspect ratio of unit layers ranging from 20 to 50 will be explained (hereinafter, sometimes merely referred to as "layered silicate"). The layered silicate used in the present invention has a structure where plurality of unit silicate layers are stacked. An exfoliated product of the layered silicate means each unit layer separated or at least some of unit layers separated. The average aspect ratio of the unit layers of the layered silicate is 10 or more, preferably 20 or more, and is 50 or less, preferably 40 or less, more preferably 30 or less. If the average aspect ratio is less than 10, the electrostatic interaction of the each unit layer becomes weak, the improved effect of the abrasion resistance becomes small. On the other hand, if the average aspect ratio is more than 50, the unit layers constituting the layered silicate hardly separate and thus the number of the electrostatic interaction points is small. As a result, the improved effect of the abrasion resistance becomes small. The average aspect ratio of the unit layers is defined as a ratio (average width/thickness) of an average width to a thickness of respective unit layers constituting the layered silicate.

The average width of unit layers is an average of the largest width of respective unit layers, and determined by a method described later. The average width of unit layers is preferably 10 nm or more, more preferably 20 nm or more, and is preferably 50 nm or less, more preferably 40 nm or less. If the average width of unit layers is 10 nm or more, the electrostatic interaction of the respective unit layers becomes large, and thus the improved effect of the abrasion resistance becomes larger. On the other hand, if the average width of unit layers is 50 nm or less, unit layers constituting the layered silicate readily separate and thus the improved effect of the abrasion resistance becomes large.

The thickness of unit layers is defined as a crystal lattice spacing of a single crystal constituting the layered silicate. The lattice spacing of the crystal depends on the type of the crystal. For example, hectorite has a spacing of 0.92 nm, montmorillonite has 1.17 nm, and muscovite has 1.00 nm.

The "layered silicate" used in the present invention is not limited, as long as the average aspect ratio of unit layers ranges from 10 to 50. Examples of the layered silicate include, a layered silicate of kaolinite group such as kaolinite, dickite, halloysite, chrysotile, lizardite, amesite; a layered silicate of smectite group such as montmorillonite, beidellite, nontronite, saponite, iron saponite, hectorite, sauconite, stevensite; a vermiculite group such as dioctahedral vermiculite, and trioctahedral vermiculite; a layered silicate of mica group such as muscovite, paragonite, phlogopite, biotie, and lepidolite; a layered silicate of brittle mica group such as margarite, clintonite, and anandite; a layered silicate of chlorite group such as cookeite, sudoite, clinochlore, chamosite, and nimite. Among them, preferred are the layered silicate of smectite group such as the hectorite, the montmorillonite, the beidellite, the nontronite, the saponite, the iron saponite, the hectorite, the sauconite, and the stevensite; and the vermiculite group such as dioctahedral vermiculite, and trioctahedral vermiculite. The layered silicate of smectite group or vermiculite group further improves the abrasion resistance of the obtained golf ball, because an expansion of an interlayer spacing and/or separation of layers are possible, and the layers have electrical charge.

In the present invention, as the "layered silicate," synthetic layered silicate (for example, synthetic hectorite) is preferably used. In the case of the synthetic layered silicate, it is easy to control the average aspect ratio of the layered silicate. As the synthetic hectorite, "Laponite RD" available from Southern Clay Products is exemplified.

The layered silicate preferably has a BET specific surface area of 300 m$^2$/g or more, more preferably 350 m$^2$/g or more. If the layered silicate has a BET specific surface area of 300 m$^2$/g or more, the electrostatic interaction points to the cationized secondary or tertiary amine structure of the polyurethane resin increase and thus the abrasion resistance of the obtained golf ball is further improved. The layered silicate has no upper limit of the BET specific surface area, but the upper limit of the BET specific surface area is about 500 m$^2$/g.

(2) Cationized Polyurethane Resin

Next, the cationized polyurethane resin will be explained. The polyurethane resin used in the present invention is not particularly limited, as long as the resin has a "secondary or tertiary amine structure" in a molecular chain (especially, main chain) thereof and a plurality of urethane bonds, wherein the secondary or tertiary amine structure is cationized. For example, the polyurethane resin can be obtained by reacting the compound having a secondary or tertiary amine structure with the polyisocyanate component and/or the polyol component. Further, if necessary, the chain extension reaction with a low-molecular weight polyol or a low-molecular weight polyamine may be conducted. Additionally, the amine incorporated polyurethane resin used in the present invention may be, for example, any of a polyurethane resin having a secondary amine structure in a molecular chain thereof, a polyurethane resin having a tertiary amine structure in a molecular chain thereof, and a polyurethane resin having a secondary and tertiary amine structure in a molecular chain thereof. In the present invention, the "secondary or tertiary amine structure" does not include a structure having a nitrogen atom bonding to a carbonyl group of an urethane bond or a urea bond of the polyurethane resin, but includes a structure having a nitrogen atom bonding to a hydrocarbon group or a hydrogen atom.

(2-1) Polyisocyanate Component

As the polyisocyanate component constituting the cationized polyurethane resin used in the present invention, polyisocyanates constituting the conventional polyurethane resins are exemplified. Examples of the polyisocyanates include an aromatic polyisocyanate such as 2,4-toluene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylene diisocyanate (TMXDI), and paraphenylene diisocyanate (PPDI); and an alicyclic polyisocyanate or aliphatic polyisocyanate such as 4,4'-dicyclohexylmethane diisocyanate (H$_{12}$MDI), hydrogenated xylylenediisocyanate (H$_6$XDI), hexamethylene diisocyanate (HDI), isophorone diisocyanate (IPDI), and norbornene diisocyanate (NBDI). These may be used alone, or as a mixture of two or more kinds.

In view of improving abrasion-resistance, as the polyisocyanate component of the cationized polyurethane resin, it is preferred to use an aromatic polyisocyanate. By using the aromatic polyisocyanate, the mechanical property of the resultant cationized polyurethane is improved, and the cover which is excellent in abrasion-resistance can be obtained. Further, in view of improving the weather resistance, as the polyisocyanate component of the cationized polyurethane resin, it is preferred to use a non-yellowing type polyisocyanate such as TMXDI, XDI, HDI, H$_6$XDI, IPDI, H$_{12}$MDI and NBDI, more preferably 4,4'-dicyclohexylmethane diisocyanate (H$_{12}$MDI). Since 4,4'-dicyclohexylmethane diisocyanate (H$_{12}$MDI) has a rigid structure, the mechanical property of the resultant cationized polyurethane resin is improved, and the cover which is excellent in abrasion-resistance can be obtained.

(2-2) Polyol Component

As the polyol component constituting the cationized polyurethane resin, polyols constituting conventional polyurethane resins are exemplified. Examples of the polyol include a low-molecular weight polyol, a high-molecular weight polyol and the like. Examples of the low-molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylol propane, and hexanetriol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. A mixture of at least two kinds of the polyols described above may also be used.

An number average molecular weight of the high-molecular weight polyol is not particularly limited, and it is preferably, for example, 400 or more, more preferably 1,000 or more. If the number average molecular weight of the high-molecular weight polyol becomes too small, the resultant polyurethane becomes too hard, so that shot feeling of the golf ball becomes lowered. An upper limit of the number average molecular weight of the high-molecular weight polyol is not particularly limited, and it is preferably 10,000, more preferably 8,000. The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

(2-3) Compound Having a Secondary or Tertiary Amine Structure

The compound having a secondary or tertiary amine structure (hereinafter, sometimes merely referred to as "amine-containing compound") is a compound having a secondary or tertiary amine structure, and at least one of hydroxyl group (OH group) and/or an amino group (NH$_2$ group) in a molecule thereof. Examples of the amine-containing compound include compounds having plurality of hydroxyl groups such as diethanolamine, N-methyl diethanolamine, N-isobutyl diethanolamine, diethanol aminopropylamine, 2-hydroxy-5-pyridine methanol; compounds having plurality of amino groups such as iminobispropylamine, methyliminobispropylamine, 1,4-bis(aminopropyl)piperazine, 2-amino-5-amino methylpyridine; compounds having one hydroxyl group such as N-benzyl-N-methylethanolamine, N,N-dibenzyl ethanolamine, N-hydroxyethoxyethyl piperazine, 2-amino-5-pyridine methanol; compounds having one amine group such as N-aminoethyl piperazine, N-aminopropyl piperazine, N-aminoethyl-4-pipecoline, N-aminopropyl-2-pipecoline, N-aminopropyl-4-pipecoline, N-aminoethyl morpholine, N-aminopropyl morpholine; or the like. The compounds may also be used as a mixture of two or more kinds. These compounds can introduce a secondary amine structure or tertiary amine structure in a molecular chain of a resultant polyurethane resin by taking the reactivity with polyisocyanate into consideration and using them appropriately.

For example, a polyol having a tertiary amine structure such as N-methyl diethanolamine and N-isobutyl diethanolamine can facilitate the introduction of the tertiary amine structure into a molecular chain of the resultant polyurethane resin, by reacting with polyisocyanate. The secondary amine structure can be suitably introduced utilizing the difference in reactivity of the imino group (secondary amine structure) and the amino group (the primary amine structure) with an isocyanate group. For example, an imino bispropylamine is a polyamine having an imino group and two amino groups, and since the amino group has higher reactivity with an isocyanate group than the imino group, the amino group and the isocyanate group of the polyisocyanate are selectively reacted by suitably controlling a molar ratio of the isocyanate group and the amino group, thereby introducing the imino group (secondary amine structure) into the resultant polyurethane resin molecular chain. For example, diethanolamine has an imino group (secondary amine structure) and two hydroxyl groups, and if the imino group (secondary amine structure) is neutralized to be cation in advance, an isocyanate group and a hydroxyl group can be reacted selectively.

If the secondary or tertiary amine structure is introduced into a terminal of a molecular chain of the polyurethane resin, for example, a compound of N,N-dibenzylethanolamine, N-hydroxyethoxyethylpiperazine, N-benzyl-N-methylethanolamine, diethanolaminopropylamine, N-aminoethylpiperazine, N-aminoethyl-4-pipecoline N-aminopropylpiperazine, N-aminopropyl-2-pipecoline N-aminopropyl-4-pipecoline N-aminoethyl morpholine, N-aminopropyl morpholine or the like may be used.

The low-molecular weight polyamine that can be used as necessary may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The constitutional embodiments of the amine incorporated polyurethane resin is not particularly limited. Examples include an embodiment where the polyurethane resin is composed of the polyisocyanate component and the amine-containing compound; an embodiment where the polyurethane resin is composed of the polyisocyanate component, the high-molecular weight polyol component and the amine-containing compound; an embodiment where the polyurethane resin is composed of the polyisocyanate component, the high-molecular weight polyol component, the low-molecular weight polyol component and the amine-containing compound; an embodiment where the polyurethane resin is composed of the polyisocyanate component, the high-molecular weight polyol component, the low-molecular weight polyol component, and the polyamine component and the amine-containing compound; and an embodiment where the polyurethane resin is composed of the polyisocyanate component, the high-molecular weight polyol component, the polyamine component and the amine-containing compound.

The content of the secondary or tertiary amine structure contained in the polyurethane resin (mole number of the secondary or tertiary amine structure contained per unit mass) is preferably $1 \times 10^{-5}$ mmol/g or more, more preferably $5 \times 10^{-5}$ mmol/g or more, even more preferably $1 \times 10^{-4}$ mmol/g or more, and is preferably $2 \times 10^{-1}$ mmol/g or less, more preferably $5 \times 10^{-2}$ mmol/g or less, even more preferably $2 \times 10^{-2}$ mmol/g or less. If the content of the secondary or tertiary amine structure falls within the above range, the electrostatic interaction between the cationized polyurethane resin and layered silicate becomes large and thus the abrasion resistance of the resultant golf ball is further improved.

In the present invention, "cationization (or cationizing)" means forming an amine of secondary or tertiary structure into an ammonium salt (a secondary ammonium salt, a tertiary ammonium salt, or a quaternary ammonium salt). A degree of "cationization" in the cationized polyurethane resin is not particularly limited, but 70 mol % or more of "secondary or tertiary amine structure" of the polyurethane resin is preferably cationized, more preferably 85 mol % or more, even more preferably 100 mol %.

(3) Other Ingredients

The cover of the golf ball of the present invention may contain other resin components in addition to the cationized polyurethane resin as a resin component, as long as it does not impair the effect of the present invention. In the case that the other resin component is used as the resin component for the cover of the present invention, the resin component preferably contains the cationized polyurethane resin in amount of 50 mass % or higher, more preferably 60 mass % or higher, and even more preferably 70 mass % or higher. Further, it is also preferable that the resin component essentially consists of the cationized polyurethane resin.

Examples of the other resin component include an ionomer resin, a thermoplastic elastomer, or the like. Examples of the ionomer resin include one prepared by neutralizing at least a part of carboxyl groups in a copolymer, composed of ethylene and (meth)acrylic acid with a metal ion; one prepared by neutralizing at least a part of carboxyl groups in a terpolymer composed of ethylene, (meth)acrylic acid, and (meth)acrylic acid ester with a metal ion; or a mixture of these two. Examples of the metal ion are: monovalent metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball. Examples of the (meth)acrylic acid ester include methyl ester, ethyl ester, propyl ester, n-butyl ester, isobutyl ester of (meth)acrylic acid.

Specific examples of the ionomer resin include "Himilan (registered trade mark)" available from MITSUI-DUPONT POLYCHEMICAL CO., LTD, "Surlyn (registered trade mark)", "HPF1000" or "HPF2000" available from DUPONT CO, and "Iotek (registered trade mark)" available from Exxon Mobil Co.

Specific examples of the thermoplastic elastomer includes a thermoplastic polyamide elastomer having a commercial name of "PEBAX (registered trade mark)" available from ARKEMA Inc; a thermoplastic polyester elastomer having a commercial name of "HYTREL" available from DU PONT-TORAY Co.; a thermoplastic polyester elastomer having a commercial name of "Primalloy (registered trade name)" available from Mitsubishi Chemical Co; a thermoplastic polystyrene elastomer having a commercial name of "Rabalon (registered trade name)" available from Mitsubishi Chemical Co; an ethylene-methacrylic acid copolymer having a commercial name of "Nucrel (registered trade mark)" available from MITSUI-DUPONT POLYCHEMICAL CO., LTD; an ethylene-methacrylic acid copolymer having a commercial name of "PRIMCOR (registered trade mark)" available from DOW CHEMICAL CO., LTD; a thermoplastic polyurethane elastomer having a commercial name of "Elastollan (registered trade mark)" available from BASF Japan Co. or the like.

The cover of the golf ball of the present invention may contain a pigment component such as a white pigment (for example, titanium oxide), a blue pigment, and a red pigment, a gravity adjusting agent such as zinc oxide, calcium carbonate and barium sulfate, a dispersant, an antioxidant, an ultraviolet absorber, a light stabilizer, a fluorescent material or a fluorescent brightener, as long as the cover performance is not damaged.

The content of the white pigment is preferably 0.5 part by mass or more, more preferably 1 part by mass or more, and preferably 10 parts by mass or less, more preferably 8 parts by mass or less based on 100 parts by mass of the resin component constituting the cover. The white pigment in an amount of 0.5 part by mass or more can impart opacity to the cover, while the white pigment in an amount of 10 parts by mass or less imparts the better durability to the resulting cover.

(4) Cover

The cover of the golf ball of the present invention is formed, for example, by a method of molding the cover composition containing the above cationized polyurethane resin and the layered silicate or a method of melting the cationized polyurethane resin, charging a slurry obtained by dispersing the layered silicate in water in advance thereto followed by kneading to prepare the cover composition in the form of pellet containing the cationized polyurethane resin and the layered silicate and molding a cover using the cover composition (slurry method). Also, as described later, the cover may be molded using the cover composition containing a polyol-layered silicate composite treated with a polyol having a secondary or tertiary amine structure in a molecule thereof, polyisocyanate component, and polyol component.

When molding a cover, the concave portions called "dimple" are usually formed on the surface. After the cover is molded, the mold is opened and the golf ball body is taken out from the mold, and as necessary, the golf ball body is preferably subjected to surface treatment such as deburring, cleaning, and sandblast. If desired, a paint film or a mark may be formed. The paint film preferably has a thickness of, but not limited to, 5 μm or larger, more preferably 7 μm or larger, and preferably has a thickness of 25 μm or smaller, more preferably 18 μm or smaller. This is because if the thickness is smaller than 5 μm, the paint film is easy to wear off due to continued use of the golf ball, and if the thickness is larger than 25 µm, the effect of the dimples is reduced, resulting in deteriorating flying performance of the golf ball.

A content of the layered silicate and/or the exfoliated product thereof in the cover is preferably 0.05 mass % or more, more preferably 0.25 mass % or more, even more preferably 0.5 mass % or more, even more preferably 0.75 mass % or more, and is preferably 7.5 mass % or less, more preferably 5 mass % or less, even more preferably 4 mass % or less, even more preferably 2 mass % or less. By making the content within the above range, the abrasion-resistance and spin performance become good.

The cover preferably has an interlayer spacing of the layered silicate of 2.7 nm or more, more preferably 5 nm or more, even more preferably 9.4 nm or more, measured by X-ray diffraction. Also, it is more preferable that a X-ray diffraction peak derived from the layered silicate is not observed, since the layered silicate is exfoliated into unit layers. It is noted that as described later in the method for preparing the golf ball of the present invention, in the case of using a polyol-layered silicate composite treated with a polyol having a secondary or tertiary amine structure in a molecule thereof, the interlayer spacing of the polyol-layered silicate composite measured by X-ray diffraction is deemed as the interlayer spacing of the cover.

The thickness of the cover of the golf ball of the present invention is not particularly limited, but it is preferably 0.3 mm or more, more preferably 0.4 mm or more, even more preferably 0.5 mm or more, and is preferably 2.0 mm or less, more preferably 1.6 mm or less, even more preferably 1.2 mm or less. If the thickness of the cover is 0.3 mm or more, it is easy to mold the cover, while it is 2.0 mm or less, the diameter of the core becomes relatively larger, and the resilience of the obtained golf ball becomes better. Herein, the thickness is measured at the portion where the dimples are not formed, that is the thickness just under the land. The thicknesses measured at least 4 portions are averaged.

The cover preferably has the slab hardness of 30 or more, more preferably 40 or more, and even more preferably 45 or more, and preferably has the slab hardness of 60 or less, more preferably 55 or less, even more preferably 50 or less in Shore D hardness. If the slab hardness of the cover is 30 or more, the repulsion property of the golf ball is improved, resulting in a greater flight distance, while if the cover hardness is 60 or less, the durability of the obtained golf ball is further improved. The slab hardness of the cover is a hardness measured in a sheet form of the cover composition, by a measuring method described later.

(5) Golf Ball Construction (5-1) Core

The golf ball of the present invention has no limitation on the construction thereof, as long as it has a core and a cover covering the core. Various cores can be employed. The core of the golf ball of the present invention includes a single-layered core, a two-layered core consisting of a center and a single-layered intermediate layer covering the core, a multi-layered core consisting of a center and multi-piece or multi-layer (especially, at least three-piece or three-layer) of intermediate layers covering the center; or a wound core. The golf ball using a single-layered core, two-layered core, multi-layered core, and a wound core are called, two-piece golf ball, three-piece golf ball, multi-piece golf ball, and a wound golf ball, respectively. The present invention can be preferably applied to anyone of the above golf balls. Preferable cores are a single-layered core, two-layered core, or a multi-layered core.

The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The core or the center of the golf ball of the present invention, is preferably molded by heat-pressing a conventional rubber composition (hereinafter, sometimes merely referred to as "core rubber composition") containing, for example, a base rubber, a crosslinking initiator, a co-crosslinking agent, and where necessary a filler.

As the base rubber, a natural rubber or a synthetic rubber can be used. Such examples include a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is 0.2 part by mass or more, the core does not become too soft, and the resilience becomes better, and if the amount is 3 parts by mass or less, a desired hardness is obtained without using the excessive amount of co-crosslinking agent, which provides the better resilience.

The co-crosslinking agent is not particularly limited as long as it has the effect of crosslinking a rubber molecule by graft polymerization to a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience. The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is 10 parts by mass or more, the desired hardness is obtained without using the excessive amount of the crosslinking initiator, which imparts the better resilience to the core. On the other hand, if the amount of the co-crosslinking agent to be used is 50 parts by mass or less, the core does not become too hard, so that the shot feeling may become better.

The filler contained in the core rubber composition is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is 2 parts by mass or more, it becomes easy to adjust the weight, while if it is 50 parts by mass or less, the weight ratio of the rubber component in the whole core becomes large and the resilience is improved.

As the core rubber composition, an organic sulfur compound, an antioxidant or a peptizing agent may be blended appropriately. As the organic sulfur compound, a diphenyl disulfide or a derivative thereof may be preferably used. Examples of the diphenyl disulfide or the derivative thereof include diphenyl disulfide; a mono-substituted diphenyl disulfide such as bis (4-chlorophenyl) disulfide, bis(3-chlorophenyl) disulfide, bis(4-bromophenyl) disulfide, bis(3-bromophenyl) disulfide, bis(4-fluorophenyl) disulfide, bis(4-iodophenyl) disulfide and bis(4-cyanophenyl) disulfide; a di-substituted diphenyl disulfide such as bis(2,5-dichlorophenyl) disulfide, bis (3,5-dichlorophenyl) disulfide, bis(2,6-dichlorophenyl) disulfide, bis (2,5-dibromophenyl) disulfide, bis(3,5-dibromophenyl) disulfide, bis (2-chloro-5-bromophenyl) disulfide, and bis(2-cyano-5-bromophenyl) disulfide; a tri-substituted diphenyl disulfide such as bis(2,4,6-trichlorophenyl) disulfide, and bis(2-cyano-4-chloro-6-bromophenyl) disulfide; a tetra-substituted diphenyl disulfide such as bis(2,3,5,6-tetra chlorophenyl) disulfide; a penta-substituted diphenyl disulfide such as bis(2,3,4,5,6-pentachlorophenyl) disulfide and bis (2,3,4,5,6-pentabromophenyl) disulfide. These diphenyl disulfides or the derivative thereof can enhance resilience by having some influence on the state of vulcanization of vulcanized rubber. Among them, diphenyl disulfide and bis (pentabromophenyl) disulfide are preferably used since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The core used in the golf ball of the present invention preferably has a diameter of 39.0 mm or larger, more preferably 39.5 mm or larger, and even more preferably 40.8 mm or larger, and preferably has a diameter of 42.2 mm or smaller, more preferably 42.0 mm or smaller, and even more preferably 41.8 mm or smaller. If the diameter of the core is 39.0 mm or more, the repulsion of the obtained golf ball is further improved. On the other hand, if the diameter of the core is 42.2 mm or less, the cover becomes relatively thick and the protection effect of the cover is further improved.

In a preferable embodiment, the core has a hardness difference between the center and the surface. The difference between the surface hardness and the center hardness is preferably 20 or more, more preferably 25 or more, and is preferably 40 or less, more preferably 35 or less, and even more preferably 30 or less in Shore D hardness. If the hardness difference is 20 or more, the shot feeling becomes better, while if the hardness difference is 40 or less, the durability becomes better. The hardness difference of the core can be adjusted by properly selecting the heat molding conditions of the core.

The surface hardness of the core is preferably 45 or more, more preferably 50 or more, even more preferably 55 or more, and is preferably 65 or less, more preferably 62 or less, even more preferably 60 or less in Shore D hardness. If the surface hardness of the core is 45 or more in Shore D hardness, the core does not become too soft and the repulsion property becomes better, resulting in the greater flight distance. On the other hand, if the surface hardness of the core is 65 or less, the core does not become too hard and the shot feeling becomes better.

The center hardness of the core is preferably 25 or more, more preferably 30 or more, even more preferably 35 or more, and is preferably 65 or less, and more preferably 62 or less, even more preferably 60 or less in Shore D hardness. If the center hardness of the core is 25 or more, the core does not become too soft and the durability becomes better, while if the center hardness of the core is 65 or less, the core does not become too hard and the shot feeling becomes better.

(5-2) Center

In the case that the core of the golf ball of the present invention is a two-layered core or a multi-layered core, the diameter of the center is preferably 30 mm or more, more preferably 32 mm or more, and is preferably 41 mm or less, more preferably 40.5 mm or less. If the diameter of the center is 30 mm or more, the intermediate layer or the cover is not too thick, and thus the repulsion becomes better. On the other hand, if the diameter of the center is 41 mm or less, the intermediate layer or the cover is not too thin, the intermediate layer or the cover functions better.

(5-3) Intermediate Layer

Examples of the resin components for the intermediate layer are an ionomer resin and thermoplastic elastomers exemplified as the resin components for the cover. The intermediate layer may further contain a gravity adjusting agent such as barium sulfate, tungsten or the like, an antioxidant, and a pigment or the like.

The intermediate layer of the golf ball of the present invention preferably has a slab hardness of 50 or larger, more preferably 55 or larger, and even more preferably 60 or larger, and preferably has a slab hardness of 75 or smaller, more preferably 72 or smaller, and even more preferably 70 or smaller in Shore D hardness. The intermediate layer having the slab hardness of 50 or more in shore D hardness improves the repulsion of the obtained golf ball, resulting in the greater flight distance. On the other hand, the intermediate layer having the slab hardness of 75 or less in shore D hardness provides an excellent shot feeling as well as suppresses the lowering of the durability by being hit repeatedly. Herein, the slab hardness of the intermediate layer is the measured hardness of the intermediate layer composition in the form of a sheet, and is measured by a later-described measuring method.

An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow shells to the compression-molding.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

(6) Method for Producing the Golf Ball

Next, a preferable method for producing the golf ball of the present invention will be explained. Preferred is a method for producing a golf ball comprising a core and a cover covering the core, comprising the steps of: cationizing a polyol having a secondary or tertiary amine structure in a molecule thereof, dispersing a layered silicate having an average aspect ratio of unit layers ranging from 10 to 50 into the cationized polyol to obtain a polyol-layered silicate composite, mixing the polyol-layered silicate composite, a polyol component, and a polyisocyanate component to prepare a cover composition, and molding a cover from the cover composition.

(6-1) Cationizing Step

In the cationizing step of the polyol having the secondary or tertiary amine structure in the molecule thereof (hereinafter, sometimes merely referred to as "amine incorporated polyol"), the secondary or tertiary amine structure in the molecule is cationized. The amine-incorporated polyol has the secondary or tertiary amine structure and plurality of hydroxyl groups in a molecule thereof. Such examples include amine-containing compounds as described above.

As the amine incorporated polyol, an urethane polyol having the secondary or tertiary amine structure (hereinafter, sometimes merely referred to as "amine incorporated urethane polyol") is preferably used. The "amine incorporated urethane polyol" is a compound having the secondary or tertiary amine structure, an urethane bond and a plurality of hydroxyl groups in a molecule thereof.

The amine incorporated urethane polyol is, for example, synthesized by reacting the polyisocyanate component with the above mentioned "amine incorporated polyol" under a condition that the hydroxyl groups of the amine incorporated polyol component is in excess to the isocyanate groups of the polyisocyanate component. When synthesizing the amine incorporated urethane polyol, another polyol may be used in addition to the polyisocyanate component and the amine incorporated polyol. As the another polyol, polyols constituting conventional polyurethanes can be exemplified, and one having a weight average molecular weight of 50 to 2,000, particularly about 100 to 1,000 is preferably used.

In the case of using another polyol, synthesis of the amine incorporated urethane polyol includes, for example, an embodiment composed of two stages comprising reacting the amine incorporated polyol and the polyisocyanate under a condition that the polyisocyanate groups are in excess to obtain an isocyanate group-terminated urethane prepolymer, followed by adding another polyol to the isocyanate group-terminated urethane prepolymer such that the hydroxyl groups of the polyol component is in excess to the isocyanate groups to bring about a reaction; and an embodiment of adding the polyisocyanate, the amine incorporated polyol and another polyol to be reacted altogether. In the embodiment of synthesizing the amine incorporated urethane polyol in two stages, the another polyol component or the polyisocyanate component may be slowly added thereto if necessary.

In the reaction, a solvent and a catalyst publicly known for a urethane reaction (such as dibutyl tin dilaurylate) can be used. As a condition for the reaction, a condition for a normal urethane reaction may be suitably selected, such as under conditions of dry nitrogen atmosphere at 20° C. to 100° C.

A weight average molecular weight of the resultant amine incorporated urethane polyol is not particularly limited, but it is preferably about 50,000 to about 200,000. The weight average molecular weight of the amine incorporated polyol component can be measured by Gel permeation Chromatography using two columns of TSK-GEL SUPREH 2500 (TOSOH Corporation) as a column, polystyrene as a standard material, and tetrahydrofuran as an eluate.

The secondary or tertiary amine structure of the amine incorporated polyol can be cationized by forming the secondary or tertiary ammonium salt with an acid such as acetic acid, hydrochloric acid, and sulfuric acid, or by forming the quaternary ammonium salt with quaternizing agents such as an alkyl halide like methyl chloride, methyl bromide, methyl iodide, ethyl chloride, ethyl bromide, and ethyl iodide, and dimethyl sulfate, diethyl sulfate. Preferred is the method of forming the secondary or tertiary ammonium salt with the acid such as acetic acid, hydrochloric acid, and sulfuric acid. The amount of the acid or the quaternizing agent can be adjusted appropriately depending on the desired degree of cationization.

(6-2) Step of Making Composite Material

The step of making a composite material includes dispersing a layered silicate having an average aspect ratio of unit layers ranging from 10 to 50 into the cationized polyol to obtain a polyol-layered silicate composite.

Dispersing the layered silicate in the polyol whose secondary or tertiary amine structure is cationized (hereinafter, sometimes merely referred to as "cationized polyol") is, without any limitation, for example, carried out by stirring at the temperature ranging from 5° C. to 75° C. for 24 hours to 72 hours. Herein, an equivalent ratio (cation exchange capacity/secondary or tertiary amine structure content) of the cation exchange capacity (meq) of the layered silicate to the content (mmol) of the secondary or tertiary amine structure preferably ranges from 1 to 5.

In the case of using a cationized urethane polyol as the cationized polyol, an interlayer spacing of the layered silicate composite to be obtained can be controlled by suitably selecting the polyol component used for synthesizing the urethane polyol. If the interlayer spacing of the polyol-layered silicate composite becomes larger, the reactivity between the cationized urethane polyol and the polyisocyanate component becomes high, and thus the reinforcing effect of the layered silicate is further enhanced. For example, if polyoxytetramethylene glycol having a high hydrophobic property is used as a polyol component of the urethane polyol, the interlayer spacing of the resultant urethane polyol-layered silicate composite becomes larger, while if polyoxyethylene glycol having a high hydrophilicity is used, an interlayer spacing of the resultant urethane polyol-layered silicate composite becomes smaller.

The layered silicate are modified with the cationized polyol to make the composite, and then separated and washed to purify the polyol-layered silicate composite. Namely, from the polyol-layered silicate composite, an unreacted cationized polyol, or a solvent or an acid added as necessary or the like are removed. A separating method is not particularly limited, and includes, for example, centrifugation. A washing method is not particularly limited, and includes a method of washing by dispersing the separated polyol-layered silicate composite in an ion-exchange water. It is also a preferred embodiment that the polyol-layered silicate composite obtained by separating and washing is subjected to freeze drying, pulverizing, and drying. The freeze drying is preferably performed for 1 to 7 days. The method of pulverizing is not particularly limited, and includes a method of grinding with a mortar and the like. In a preferred embodiment, the pulverizing is carried out to the extent that an average particle diameter becomes about 0.1 μm to 100 μm.

The polyol-layered silicate composite obtained by pulverizing is dried again if necessary. If moisture exists during a reaction with the polyisocyanate, the polyisocyanate and the moisture react with each other to cause foaming. Drying conditions are not particularly limited, and for example, the polyol-layered silicate composite may be dried in a vacuum oven at 80° C. for 1 day.

In the polyol-layered silicate composite, the cationized polyol is intercalated between layers of the layered silicate, and thus a distance between layers becomes wider, or a layered structure of the layered silicate is broken into an exfoliated product where unit layers are in a single-leaf state. Accordingly, when the polyol-layered silicate composite is measured by X-ray diffraction, an interlayer spacing of the resultant layered silicate is preferably 2.7 nm or more, more preferably 5 nm or more, even more preferably 9.4 nm or more, or a X-ray diffraction peak derived from the layered silicate is not observed.

(6-3) Preparing Step

The preparing step includes mixing the polyol-layered silicate composite, a polyol component, and a polyisocyanate component to prepare a cover composition. The cover composition may contain the polyol-layered silicate composite, a polyol component and a polyisocyanate in an uncured state or may be in the form of pellet containing the layered silicate and the cationized polyurethane resin after reacting the polyol-layered silicate composite, the polyol component and the polyisocyanate component. When preparing the cover composition, it is preferable to dispersing the layered silicate into the polyol component, and subjecting the mixture of the layered silicate and the polyol component to the ultrasonic treatment before adding the polyisocyanate component.

The charging ratio of the polyisocyanate component to the polyol-layered silicate composite and the polyol component in the cover composition is, preferably 1.00 or larger, more preferably 1.02 or larger, and even more preferably 1.04 or larger, and is preferably 1.10 or smaller, more preferably 1.08 or smaller, and even more preferably 1.06 or smaller in a molar ratio (NCO/OH) of the isocyanate group (NCO) contained in the polyisocyanate component to the hydroxyl group (OH) contained in the polyol-layered silicate composite and polyol component.

The temperature at which the urethane reaction is performed is preferably 70° C. or higher, more preferably 75° C. or higher, and is preferably 90° C. or lower, more preferably 85° C. or lower. The reaction time for the urethane reaction is preferably 10 hours or longer, more preferably 12 hours or longer, and even more preferably 15 hours or longer, and is preferably 30 hours or shorter, more preferably 25 hours or shorter, and even more preferably 20 hours or shorter.

(6-4) Molding Step

In the molding step, the cover is molded using the cover composition. For example, employed is a method which comprises molding the cover composition in advance into two hemispherical half shells, covering the core together with the two half shells and subjecting the core with two half shells to the press molding at 130 to 170° C. for 1 to 5 minutes; or a method which comprises injection molding the cover composition directly onto the core to cover the core. In an embodiment using the cover composition in an uncured embodiment, for example, a cover is prepared by holding a core in a hemispherical-shaped mold filled with the cover composition and curing the cover composition to prepare a hemispherical-shaped cover, followed by inverting the core to combine it with another hemispherical mold filled with the cover composition and curing the cover composition to form a cover.

EXAMPLES

Hereinafter, the present invention will be described in more detail with reference to Examples, but the present invention is not restricted by the following Examples and can be suitably modified within the scope described above or below and such modifications are also included in the technical scope of the present invention.

[Evaluation Method]

(1) Abrasion-Resistance

A commercially available sand wedge was installed on a swing robot available from Golf Laboratories, Inc., and two points of a ball were both hit once at a head speed of 36 m/sec. Each hit portion was observed and evaluated based on the following criteria, and an average score for the two points was calculated. A smaller score indicates higher abrasion-resistance.

0 point: No hitting marks were observed.
1 point: Dot-like peeling (a maximum width is smaller than 3 mm) was observed.
2 point: Dot-like peeling (a maximum width is 3 mm or larger and smaller than 5 mm) was observed.
3 point: Line-like peeling (a maximum width is 5 mm or larger) was observed.
4 point: Clear line-like peeling (a maximum width is 5 mm or larger) was observed.
5 point: Deep and wide line-like peeling (a maximum width is 5 mm or larger) was observed.
6 point: Deep and wide peeling which was almost a plane was observed.
7 point: A part of the cover was scraped away as a plane.

(2) Spin Rate (rpm)

An approach wedge (SRIXON I-302, Shaft S) available from SRI Sports Limited was installed on a swing robot available from Golf Laboratories, Inc. and a golf ball was hit at a head speed of 21 m/second. The spin rate was measured by continuously taking photographs of the golf ball which had been hit. The measurement was carried out five times, and the average values of the result are shown.

(3) Slab Hardness of the Cover (Shore D Hardness)

A sheet having a thickness of about 2 mm was prepared using the cover composition by hot press molding, and the sheet was preserved at the temperature of 23° C. for two weeks. Three or more of the sheets were stacked on one another to avoid being affected by the measuring substrate on which the sheets were placed, and the stack was subjected to the measurement using P1 type automatic rubber hardness tester manufactured by Kobunshi Keiki Co., Ltd. provided with Shore D type spring hardness tester prescribed by ASTM-D2240.

(4) Spherical Core (Center) Hardness

The hardness measured at a surface part of the core and the center using a P1-type automatic rubber hardness tester provided with Shore D type spring hardness tester specified by ASTM-D2240 were determined as the surface hardness of the core and the center, respectively. The Shore D hardness obtained by cutting a spherical core (center) into halves and measuring at the center of the cut surface was determined as the center hardness of the core (center).

(5) Method for Measuring Content of Layered Silicate (TGA and Fluorescent X-Ray Diffraction)

Using TGA2950 manufactured by TA Instruments., 10 mg of a cover composition was heated under a nitrogen atmosphere and under following conditions, and a change in weight after keeping at 650° C. for 1.5 minute with respect to a weight at 25° C. was measured, thereby obtaining a content ratio of an inorganic component in the cover composition. Heating conditions: 25° C. to 650° C. (heating speed: 50° C./minute, keeping at 650° C. for 1.5 minute)

Simultaneously, a weight ratio of each element contained in the inorganic component in the cover composition (Ti, Si, Al, and other inorganic elements) is obtained from a X-ray diffraction peak of the cover composition, and a content of the layered silicate in the cover composition was calculated on the premise that Ti is attributed to titanium oxide ($TiO_2$), Si and Al to clay components, and other inorganic elements to other inorganic components.

X-ray diffraction was measured under the following conditions.
Name of device: SEA1200VX
Manufacturer: SII
X-ray source (X-ray tube target): rhodium (Rh)
Tube voltage: 50 kV, 15 kV
Tube current: automatic adjustment
Tube cooling type: air-cooling type
Detector: Si semiconductor detector
Analyzed area (a diameter of collimator): 8 mm
Temperature of the sample: room temperature (23° C.)
Sample chamber atmosphere: vacuum
Measuring range: 0 Key to 40 keV (Measured element: 11 (Na) to 92(U))
Measuring time: 200 seconds (6) Interlayer Spacing of Urethane Polyol-Layered Silicate Composite by X-Ray Diffraction An interlayer spacing (d) of the urethane polyol-layered silicate composite was obtained using X-ray diffraction device MXP3 manufactured by MAC Science.

X-ray source: CuKα ray (wavelength λ=1.5418 Å)
Applied voltage: 40 kV
Applied current: 30 mA
Measuring range: 2θ=0.01° to 10°
Intake range: 0.01°
Calculation formula: 2d sin θ=λ=1.5418 Å (θ: a half value of an angle of the peak (2θ))

(7) Measurement of an Average Width of Unit Layers of the Layered Silicate

A part of the cover of the golf ball was cut off to prepare a sample using a TEM sample pretreatment equipment (Cryo microtome EMUC6 available from Leica) under the following conditions.
Temperature for cutting out a section: sample at −130° C., knife at −140° C., atmosphere at −140° C.
Speed for cutting out a section: 1 mm/second
Predetermined thickness of a section cut out: 40 nm The obtained sample was observed using the transmission electron microscope H7100 manufactured by Hitachi, Ltd under the following conditions, and the largest width of all the layered silicate in the visual field were measured and averaged to determine an average width of unit layers. In the case that the layered silicate is exfoliated, largest width of respective unit layers were measured. In the case that layered silicate maintain the layered structure, the largest length of the width direction of the layered structure was measured. Conditions for observation: accelerating voltage of 100 kV, magnification of 5,000 to 100,000 times, visual field of 20 μm×20 μm (A) [Synthesis of Urethane Polyol-Layered Silicate Composite]

(A1) Synthesis of Urethane Polyol Having Tertiary Amine Structure 53.6 g of hexamethylene diisocyanate (HDI) was put in a state of being stirred under dry nitrogen air flow at 30° C., and 19.0 g of N-methyl diethanolamine (MDEA) was dropped thereto as a polyol having a tertiary amine structure for 20 minutes followed by stirring for about two hours, thereby obtaining an isocyanate group-terminated MDEA. An end point of the reaction was judged by subjecting a reaction product to titration specified by JIS and confirming whether or not hexamethylene diisocyanate (HDI) was reacted in a theoretical amount.

Next, as shown in Table 1, polyol and dibutyl tin dilaurylate (DBTDL) were blended and stirred at 65° C. under dry nitrogen air flow, and the isocyanate group-terminated MDEA was dropped thereto for 30 minutes followed by reacting for 30 minutes, thereby synthesizing the urethane polyol having the tertiary amine structure. An end point of the reaction was determined by confirming that a peak derived from an isocyanate group (about 2270 $cm^{-1}$) did not exist.

TABLE 1

| Formulation of Urethane polyol having a ternary amine structure (g) | |
|---|---|
| HDI | 53.6 |
| MDEA | 19.0 |
| PTMG2000 | 637 |
| DBTDL | 0.1 |

HDI: hexamethylene diisocyanate manufactured by Wako Pure Chemical Industries, Ltd.
PTMG2000: polytetramethylene ether glycol with a molecular weight of 2000 manufactured by Hodogaya Chemical Co., LTD.

(A2) Cationization of Urethane Polyol Having the Tertiary Amine Structure

In 354.9 g of the urethane polyol having the tertiary amine structure obtained above, 1000 g of a mixture of an ion-exchange water and an isopropyl alcohol (ion-exchange water:isopropyl alcohol=3:7 (volume ratio)) was added, and the temperature of the mixture was made 65° C., thereby preparing a dispersion liquid. In the urethane polyol dispersion liquid, 6N—HCl was dropped until pH of the dispersion liquid became 3 to cationize the tertiary amine structure, thereby obtaining a dispersion liquid of the cationized urethane polyol.

(A3) Modifying the Layered Silicate with the Cationized Urethane Polyol for Preparing the Composite 35 g of the layered silicate shown in Table 2 were dispersed in 2.3 L of a mixture of an ion-exchange water and an isopropyl alcohol (ion-exchange water:isopropyl alcohol=4:6 (volume ratio)), thereby obtaining a dispersion liquid of the layered silicate. The dispersion liquid of the layered silicate was added to the dispersion liquid of the cationized urethane polyol, and the liquid was stirred at 65° C. for two days, thereby obtaining a dispersion liquid of an urethane polyol-layered silicate composite.

After that, the dispersion liquid of the urethane polyol-layered silicate composite was repeatedly subjected to centrifugation and dispersed in the ion-exchange water to remove a free hydrochloric acid from the system. Whether or not the fee hydrochloric acid was removed from the system was judged by reacting a supernatant liquid of the dispersion liquid of the urethane polyol-layered silicate composite with a silver nitrate. If deposition of the silver chloride was recognized, it is judged that the free hydrochloric acid existed in the dispersion liquid of the urethane polyol-layered silicate composite, and the centrifugation and the dispersion to the ion-exchange water were repeated again. The resultant urethane polyol-layered silicate composite was freeze dried for one day, and the dried material was ground with mortar, and screened to obtain only the material having a size of 200 μm or less. Properties of the urethane polyol-layered silicate composite are shown in Table 2.

(B) The powder-like urethane polyol-layered silicate composite was added in PTMG 1000, and the mixture was stirred at 65° C. for 1 hour followed by being subjected to ultrasonic treatment for one hour using the Vibra-Cell VC505 manufactured by Sonics & Materials, Inc., thereby dispersing the urethane polyol-layered silicate composite in the polyol. The resultant composition of the polyol dispersion liquid was shown in Table 3.

TABLE 3

| | | Polyol dispersion No. | | |
|---|---|---|---|---|
| | | 1 | 2 | 3 |
| Formulation (parts by mass) | Urethane polyol-layered silicate composite No. 1 (Laponite RD) | 2 | — | — |
| | Urethane polyol-layered silicate composite No. 2 (Cloisite Na$^+$) | — | 2 | — |
| | Urethane polyol-layered silicate composite No. 3 (Benton EW) | — | — | 2 |
| | PTMG 1000 | 100 | 100 | 100 |

PTMG1000: polytetramethylene ether glycol molecular weight 1000 manufactured by Hodogaya Chemical Co., LTD.

(C) Preparation of Cover Composition (C1) Use of 4,4'-diphenylmethane diisocyanate as polyisocyanate Under dry nitrogen air flow, 18 g of a polyol dispersion liquid of urethane polyol-layered silicate composite was heated to 65° C., and 19.0 g of 4,4'-diphenylmethane diisocyanate (MDI) heated to 65° C. was added thereto and the mixture was stirred at 65° C. for 1 minute followed by cooling to about 40° C. After that, 4.9 g of butanediol (BD) at 40° C. was charged thereto and stirred at 45° C. for 30 seconds. The mixture was cooled to the room temperature and degassed under the reduced pressure at the room temperature for 30 seconds. The resultant product was put in a container to carry out a urethane reaction by reacting the product under a nitrogen atmosphere at 80° C. for 1 hour, and continuously keeping the product at 110° C. for 6 hours. After finishing the urethane reaction, the resultant product was pulverized into the form of pellet, thereby obtaining a polyurethane resin composition wherein the layered silicate and/or the exfoliated product thereof was composite-dispersed in the polyurethane resin.

TABLE 2

| | | | Urethane polyol-layered silicate composite No. | | |
|---|---|---|---|---|---|
| | | | 1 | 2 | 3 |
| Charging amount (g) | Layered Silicate | Laponite RD having an average aspect ratio of 27 | 35 | — | — |
| | | Closite Na having an average aspect ratio of 85 | — | 35 | — |
| | | Benton EW having an average aspect ratio of 109 | — | — | 35 |
| | Urethane polyol having tertiary amine structure | | 354.9 | 354.9 | 354.9 |
| Interlayer spacing (nm) | | | N.D. | 9.4 | 9.8 |

Notes on Table 2
Laponite RD: synthetic hectorite having an average aspect ratio of 27 (crystal lattice spacing of a single crystal: 0.92 nm, average width of unit layers: 25 nm), cation exchange capacity 50 meq/100 g, and BET specific surface area of 370 m$^2$/g (catalog value) available from Southern Clay Products Inc.
Cloisite Na$^+$: natural montmorillonite having an average aspect ratio of 85 (crystal lattice spacing of a single crystal: 1.17 nm, average width of unit layers: 100 nm), cation exchange capacity 92.6 meq/100 g available from Southern Clay Products Inc.
Benton EW: natural hectorite having an average aspect ratio of 109 (crystal lattice spacing of a single crystal: 0.92 nm, average width of unit layers: 100 nm), cation exchange capacity 50 meq/100 g available from Elementis.
N.D.: Not detected (C2) Use of 4,4'-dicyclohexylmethane diisocyanate as polyisocyanate Under dry nitrogen air flow, 19.6 g of 4,4'-dicyclohexylmethane diisocyanate ($H_{12}MDI$) and 0.002 g of dibutyl tin dilaurylate were charged into a flask and heated to 60° C. 18.0 g of a polyol dispersion liquid was dropped thereto for about 45 minutes using a dropping funnel, and after finishing the dropping, the mixture was heated at 60° C. for 2 hours for the reaction. Then, 4.9 g of butanediol (BD) at 60° C. was added and stirred for about 1 minute. The mixture was cooled to a room temperature and degassed under the reduced pressure at room temperature for 30 seconds. The resultant product was put in a container to carry out a urethane reaction by keeping the product for 48 hours under nitrogen at 80° C. After finishing the urethane reaction, the resultant product was pulverized in the form of pellet, thereby obtaining a polyurethane resin composition wherein the layered silicate and/or the exfoliated product thereof was composite-dispersed in a polyurethane resin.

(D) [Preparation of Golf Ball]

(D1) Preparation of Center

The rubber composition for the center shown in Table 4 was kneaded and pressed with upper and lower molds each having a spherical cavity at the heating condition of 170° C. for 15 minutes to obtain the center in a spherical shape having a diameter of 38.5 mm and a weight of 34.9 g.

TABLE 4

| Center composition | Part by mass |
| --- | --- |
| Polybutadiene rubber | 100 |
| Zinc acrylate | 35 |
| Zinc oxide | 5.0 |
| Diphenyl disulfide | 0.5 |
| Dicumyl peroxide | 1 |
| Center hardness (Shore D) of center (core) | 40 |

Notes on table 4
Polybutadiene rubber: BR730 (high cis-polybutadiene) manufactured by JSR
Zinc acrylate: ZNDA-90S manufactured by NIHON JYORYU KOGYO Co,. LTD.
Zinc oxide: "Ginrei R" produced by Toho-Zinc Co.
Diphenyl disulfide: manufactured by Sumitomo Seika Chemicals Company Limited
Dicumyl peroxide: Percumyl D manufactured by NOF Corporation (D2) Formulation of Intermediate Layer Material and Cover Composition Next, an intermediate layer material and a cover composition shown in Tables 5 and 6 were mixed by a twin-screw kneading extruder, thereby preparing an intermediate layer material and a cover composition in the form of pellet. Extrusion was carried out in the following conditions: screw diameter=45 mm, screw revolutions=200 rpm, screw L/D=35, and the mixture was heated to from 150 to 230° C. at the die position of the extruder.

TABLE 5

| Intermediate layer composition | Part by mass |
| --- | --- |
| Himilan 1605 | 50 |
| Himilan AM7329 | 50 |
| Slab hardness (shore D) of intermediate layer | 64 |

Notes on table 5
"Himilan 1605": Sodium ion-neutralized ethylene-methacrylic acid copolymer ionomer resin manufactured by MITSUI-DUPONT POLYCHEMICAL.
"Himilan AM7329": Zinc ion-neutralized ethylene-methacrylic acid copolymer ionomer resin manufactured by MITSUI-DUPONT POLYCHEMICAL.

The resultant material for the intermediate layer was injection molded onto the center thus obtained to prepare a core having a center and an intermediate layer (thickness of 1.6 mm) covering the center. The core has a surface hardness of 61 in Shore D hardness.

(D3) Molding of Half Shell

The half shells were compression-molded by charging the cover composition in the form of the pellet obtained as described above by one piece into each of the depressed parts of the lower molds, and applying pressure to mold half shells. The compression-molding was carried out under the pressure of 2.94 MPa, at the temperature of 180° C. for 5 minutes in the case of MDI polyurethane resin, and at the temperature of 160° C. for 5 minutes in the case of $H_{12}MDI$ polyurethane resin.

(D4) Molding of Cover

The core obtained in (D2) was covered with two half shell obtained in (D3) in a concentric manner, and a cover (thickness 0.5 mm) was molded by compression molding. The compression molding was performed under conditions of: molding temperature at 150° C., molding time for 2 minutes and a molding pressure at 9.8 MPa.

A surface of the resultant golf ball body is subjected to sandblast treatment and marking, and then coated with a clear paint, and the paint was dried in an oven at 40° C., thereby obtaining golf balls having a diameter of 42.7 mm and a mass of 45.3 g. Abrasion-resistance, and spin performance were evaluated with respect to the resultant golf ball, and the results are shown in Table 6.

TABLE 6

| | | | Golf ball No. | | | | |
| --- | --- | --- | --- | --- | --- | --- | --- |
| | | | 1 | 2 | 3 | 4 | 5 |
| Cover composition | Formulation | Polyol dispersion No. 1 (Laponite RD) | 43 | 42.4 | — | — | — |
| | | Polyol dispersion No. 2 (Cloisite Na$^+$) | — | — | 43 | 42.4 | — |
| | | Polyol dispersion No. 3 (Benton EW) | — | — | — | — | 43 |
| | | MDI | 45.3 | — | 45.3 | — | 45.3 |
| | | $H_{12}MDI$ | — | 46.1 | — | 46.1 | — |
| | | BD | 11.7 | 11.5 | 11.7 | 11.5 | 11.7 |
| | | Titanium oxide | 3 | 3 | 3 | 3 | 3 |
| | Evaluation | Interlayer spacing of Urethane polyol-layered silicate composite (nm) | N.D. | N.D. | 9.4 | 9.4 | 9.8 |
| | | Average width of unit layers of Layered silicate or the exfoliated product (nm) | 25 | 25 | 100 | 100 | 100 |
| | | Slab hardness (Shore D) | 47 | 47 | 47 | 47 | 47 |
| | Properties | Layered silicate content of the cover (mass %) | 1 | 1 | 1 | 1 | 1 |
| | | Amine structure content of the polyurethane resin (mmol/g) | $5.0 \times 10^{-3}$ | $5.0 \times 10^{-3}$ | $9.3 \times 10^{-3}$ | $9.3 \times 10^{-3}$ | $5.0 \times 10^{-3}$ |
| | | Abrasion resistance | 2 | 1 | 4 | 3 | 4 |
| | | Spin rate (rpm) | 6,800 | 6,700 | 6,800 | 6,700 | 6,800 |

Formulation: parts by mass,
N.D.: not detected

Golf ball No. 1 is the case that MDI is used as the polyisocyanate component constituting the polyurethane resin and the layered silicate having an average aspect ratio of unit layers ranging from 10 to 50. Golf ball No. 1 showed the improved abrasion resistance while keeping the high spin rate, compared with the golf balls Nos. 3 and 5 using the same polyisocyanate component and containing the layered silicate having an average aspect ratio of more than 50.

Golf ball No. 2 is the case that $H_{12}MDI$ is used as the polyisocyanate component constituting the polyurethane resin and the layered silicate having an average aspect ratio of unit layers ranging from 10 to 50. Golf ball No. 2 showed the improved abrasion resistance while keeping the high spin rate, compared with the golf balls Nos. 4 using the same polyisocyanate component and containing the layered silicate having an average aspect ratio of more than 50.

The present invention is useful for improving the abrasion resistance of the cover of the golf ball and the controllability of the golf ball. This application is based on Japanese Patent application No. 2009-154269 filed on Jun. 29, 2009, the contents of which are hereby incorporated by reference.

What is claimed is:

1. A golf ball comprising a core and a cover covering the core, wherein the cover comprises
    a polyurethane resin having a molecular chain with a secondary or tertiary amine structure, the secondary or tertiary amine structure being cationized, and
    an exfoliated product of a layered silicate including a synthetic hectorite and having unit layers with an average aspect ratio ranging from 10 to 50, wherein the unit layers of the layered silicate have an average width ranging from 10 nm to 50 nm.

2. The golf ball according to claim 1, wherein the cover does not exhibit an X-ray diffraction peak attributed to the layered silicate.

3. The golf ball according to claim 1, wherein a content of the exfoliated product of the layered silicate contained in the cover ranges from 0.05 mass % to 7.5 mass %.

4. The golf ball according to claim 1, wherein the secondary or tertiary amine structure in the molecular chain of the polyurethane resin is present in the polyurethane resin in an amount ranging from $1 \times 10^5$ mmol/g to $2 \times 10^4$ mmol/g.

5. The golf ball according to claim 1, wherein the layered silicate has a BET specific surface area of 300 $m^2$/g or more.

6. The golf ball according to claim 1, wherein the secondary or tertiary amine structure in the polyurethane resin is cationized in a molar ratio ranging from 70 mol % to 100 mol %.

7. The golf ball according to claim 1, wherein the cover has a thickness ranging from 0.3 mm to 2.0 mm.

8. The golf ball according to claim 1, wherein the cover has a slab hardness ranging from 30 to 60 in Shore D hardness.

9. The golf ball according to claim 1, wherein the core has a hardness difference from 20 to 40 in Shore D hardness between a surface hardness and center hardness thereof.

10. The golf ball according to claim 1, wherein the core is a multi-layered core having a center and at least one intermediate layer covering the center.

11. The golf ball according to claim 10, wherein the intermediate layer has a slab hardness ranging from 50 to 75 in Shore D hardness.

12. A method for producing a golf ball having a core and a cover covering the core, comprising the steps of:
    providing a core,
    cationizing a polyol having a secondary or tertiary amine structure present in a molecule thereof,
    dispersing a layered silicate including a synthetic hectorite and having a BET specific surface area of 300 $m^2$/g or more, an average aspect ratio of unit layers thereof ranging from 10 to 50 and an average width of unit layers thereof ranging from 10 nm to 50 nm into the cationized polyol to obtain a polyol-layered silicate composite,
    mixing the polyol-layered silicate composite, a polyol component, and a polyisocyanate component to prepare a cover composition, and
    molding a cover from the cover composition to cover the core.

13. The method for producing the golf ball according to claim 12, wherein the polyol having the secondary or tertiary amine structure in the molecule thereof is cationized using an acid.

14. The method for producing the golf ball according to claim 12, wherein the cover composition is prepared by subjecting a mixture of the polyol-layered silicate composite and the cationized polyol to ultrasonic treatment, and subsequently mixing the polyisocyanate component with the mixture.

15. The method for producing the golf ball according to claim 12, wherein the polyol is a urethane polyol.

16. The method for producing the golf ball according to claim 12, wherein dispersing is conducted in an equivalent ratio (cation exchange capacity/secondary or tertiary amine structure content) of a cation exchange capacity of the layered silicate to a secondary or tertiary amine structure content of the cationized polyol ranging from 1 to 5.

17. The method for producing the golf ball according to claim 12, wherein a mixing ratio of the polyisocyanate component to the polyol-layered silicate composite and the polyol component in the cover composition ranges from 1.00 to 1.10 based on a molar ratio (NCO/OH) of the isocyanate group (NCO) contained in the polyisocyanate component to the hydroxyl group (OH) contained in the polyol-layered silicate composite and polyol component.

* * * * *

UNITED STATES PATENT AND TRADEMARK OFFICE
CERTIFICATE OF CORRECTION

PATENT NO. : 9,174,089 B2
APPLICATION NO. : 12/821633
DATED : November 3, 2015
INVENTOR(S) : Kazuyoshi Shiga et al.

Page 1 of 1

It is certified that error appears in the above-identified patent and that said Letters Patent is hereby corrected as shown below:

ON THE TITLE PAGE:

At item (73), Assignee, change:

"(73) Assignee: DUNLOP SPORTS CO. LTD., Kobe-shi (JP)"

to:

--(73) Assignees: DUNLOP SPORTS CO. LTD., Kobe-shi (JP); SUMITOMO RUBBER INDUSTRIES LIMITED, Kobe-shi (JP)--.

Signed and Sealed this
Fifth Day of July, 2016

Michelle K. Lee
*Director of the United States Patent and Trademark Office*